United States Patent
Scott (10) Patent No.: US 6,591,796 B1
(45) Date of Patent: Jul. 15, 2003

(54) COMBINATION PCV BAFFLE AND RETAINER FOR SOLENOID VALVES IN A HYDRAULIC MANIFOLD ASSEMBLY FOR VARIABLE ACTIVATION AND DEACTIVATION OF ENGINE VALVES

(75) Inventor: Matthew T. Scott, Henrietta, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/080,235

(22) Filed: Feb. 21, 2002

(51) Int. Cl.[7] .................................................. F01L 9/02
(52) U.S. Cl. ............................... 123/90.13; 123/90.12; 123/90.15; 123/90.55; 123/572; 251/129.01; 251/129.15
(58) Field of Search ................. 123/90.12, 41.86, 123/572, 574, 90.13, 90.16, 90.48, 90.55, 470, 573; 251/90.12, 129.01, 129.15

(56) References Cited

U.S. PATENT DOCUMENTS 5,852,992 A * 12/1998 Boggs et al. ........... 123/196 R
6,439,176 B1 * 8/2002 Payne et al. ............. 123/90.12

* cited by examiner

Primary Examiner—Thomas Denion
Assistant Examiner—Ching Chang
(74) Attorney, Agent, or Firm—Patrick M. Griffin

(57) ABSTRACT

A hydraulic manifold assembly for variable actuation of engine valves. First and second plates have portions of flow passages integrally molded therein. The plates are formed preferably by injection molding of a suitable polymer, for example, glass-filled PPA, and are joined together as by cementing or preferably by fusion welding along mating surfaces to form the full pattern of flow passages. The assembly further comprises a retainer for retaining a plurality of individual solenoid-actuated valves in sockets formed in the plates. The retainer is similarly formed preferably by injection molding of a suitable polymer and is formed to function simultaneously as a positive crankcase ventilation (PCV) baffle.

9 Claims, 8 Drawing Sheets

COMBINATION PCV BAFFLE AND RETAINER FOR SOLENOID VALVES IN A HYDRAULIC MANIFOLD ASSEMBLY FOR VARIABLE ACTIVATION AND DEACTIVATION OF ENGINE VALVES

TECHNICAL FIELD

The present invention relates to internal combustion engines; more particularly, to devices for controlling systems in an internal combustion engine; and most particularly, to an assembly for retaining the solenoid deactivation control valves and for providing positive crankcase ventilation (PCV).

BACKGROUND OF THE INVENTION

In conventional prior art four-stroke internal combustion engines, the mutual angular relationships of the crankshaft, camshaft, and valves are mechanically fixed; that is, the valves are opened and closed fully and identically with every two revolutions of the crankshaft, fuel/air mixture is drawn into each cylinder in a predetermined sequence, ignited by the sparking plug, and the burned residue discharged. This sequence occurs irrespective of the rotational speed of the engine or the load being placed on the engine at any given time.

It is known that for much of the operating life of a multiple-cylinder engine, the load might be met by a functionally smaller engine having fewer firing cylinders, and that at low-demand times fuel efficiency could be improved if one or more cylinders of a larger engine could be withdrawn from firing service. It is known in the art to accomplish this by de-activating the valve train leading to pre-selected cylinders in any of various ways, such as by providing special valve lifters having internal locks which may be switched on and off either electrically or hydraulically. Such switching is conveniently performed via a hydraulic manifold assembly that utilizes electric solenoid valves to selectively pass engine oil to the lifters upon command from an engine control module (ECM). Such a manifold assembly is often referred to in the art as a Lifter Oil Manifold Assembly (LOMA).

It is a principal object of the present invention to provide an assembly for retaining the solenoid valves and for positive crankcase ventilation comprising a minimum number of components which then may be easily fabricated, and preferably which are formed of a suitable thermoplastic polymer such that the components may be fusibly joined without threaded fasteners as by vibration welding.

SUMMARY OF THE INVENTION

Briefly described, a hydraulic manifold assembly for variable actuation of engine valves includes first (top) and second (bottom) plates having portions of oil flow passages, or galleries, integrally molded therein. The plates are formed preferably by injection molding of a suitable high temperature thermoplastic polymer. The plates are joined together as by cementing or preferably by fusion welding (vibration welding) along mating surfaces, obviating the need for separate fasteners and for internal seals on the flow passages. The hydraulic manifold assembly further comprises a retainer for retaining a plurality of individual solenoid-actuated valves in operational disposition in sockets formed in the plates.

In accordance with this invention, the retainer is also formed of a moldable polymer and with air passageways so as to function simultaneously as a PCV baffle that attaches to the hydraulic manifold assembly via integrally molded releasable snap clips. Alternatively, the retainer can be attached to a polymer hydraulic manifold assembly or to a conventional metal hydraulic manifold assembly via bolts or similar attachment means. The present invention results in a weight savings and a substantial savings in be manufacturing cost over prior art assemblies formed of cast aluminum.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
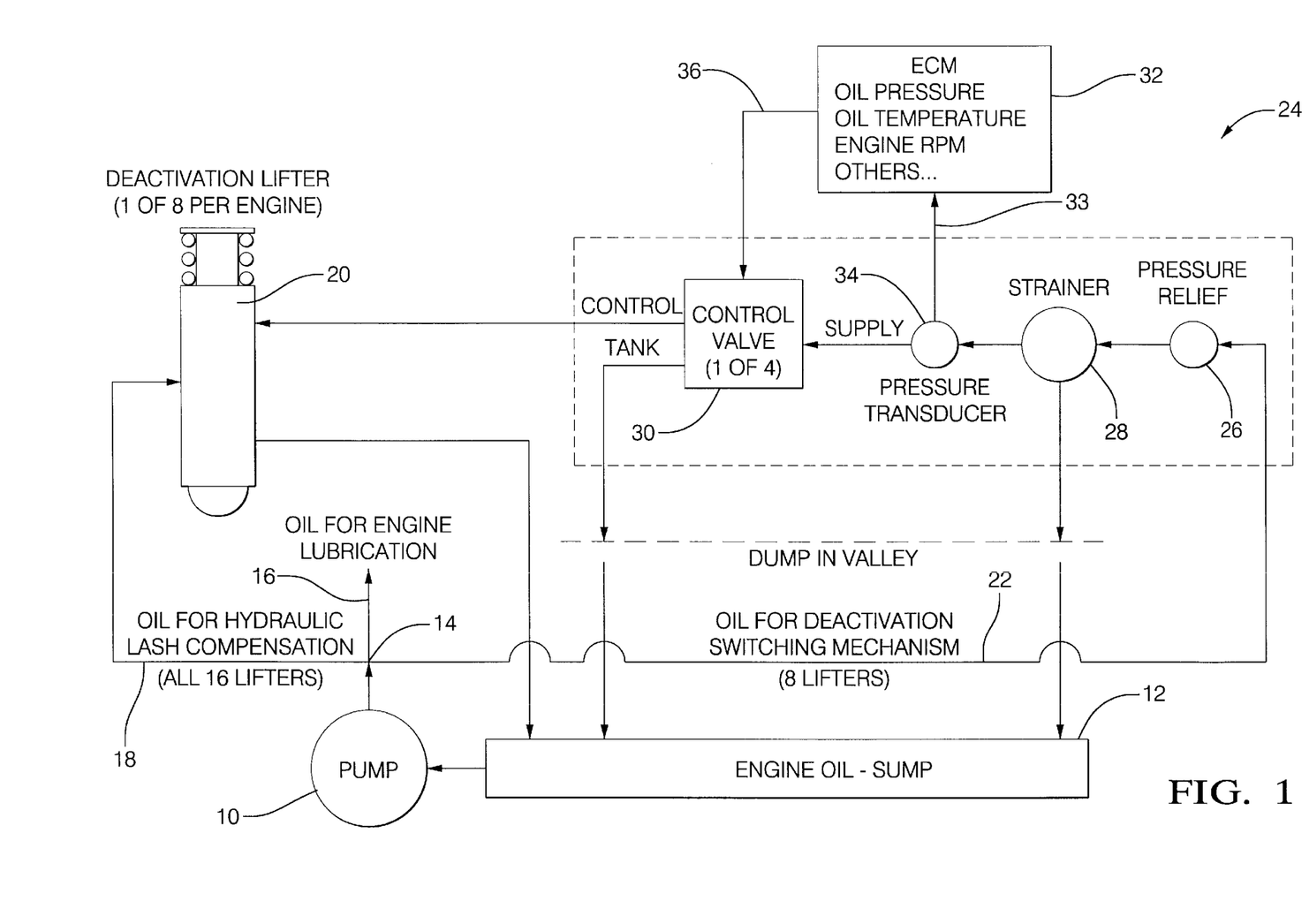
FIG. 1 is a schematic drawing of an oil system for an internal combustion engine showing the relationship of a valve deactivation control system in accordance with the invention.

Referring to FIG. 1, the engine oil circuits for an internal combustion engine are provided with a valve deactivation control circuit in accordance with the invention. While only a single control valve and lifter are shown in the schematic drawing, it should be understood that valve deactivation is useful only in multiple-cylinder engines for selectively reducing the number of combusting cylinders. Multiple-cylinder embodiments are discussed below. In FIG. 1, an oil pump 10 feeds oil from sump 12 to a juncture 14 where the flow is split three ways. A first portion 16 provides conventional general lubrication to the engine. A second portion 18 provides oil conventionally to the hydraulic valve lash adjusters 19, which support valve deactivation lifters 20. A third portion 22 provides oil to a valve deactivation control system 24. An optional pressure relief valve 26 is openable to the sump to maintain pressure in system 24 at a predetermined maximum level. Oil is filtered by strainer 28 and then is supplied to a solenoid control valve 30 wherein it is either diverted to the sump 12 if the control valve 30 is not energized, or is diverted to deactivation lifter 20 if the control valve 30 is energized, to cause the associated engine intake and exhaust valves to be deactivated. An ECM 32, preferably mounted on other than the engine, receives input signals 33 from a pressure transducer 34 in the control system 24 and integrates via an algorithm such signals with other input operating data such as oil temperature and engine speed to provide output signals 36 to energize or de-energize solenoid control valve 30.

Figure 2:
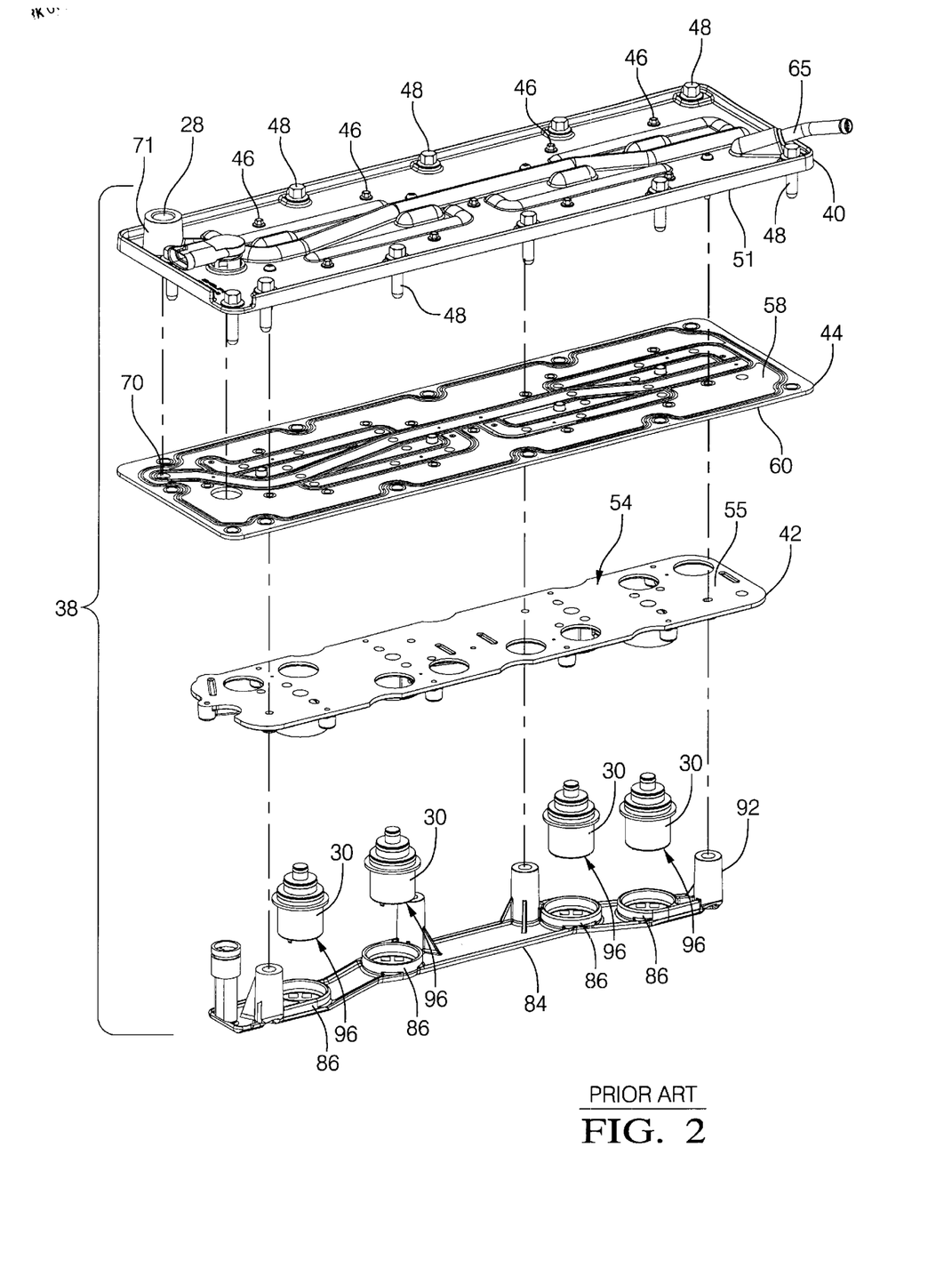
FIG. 2 is an exploded isometric view from above of a prior art hydraulic manifold assembly.
Figure 3:
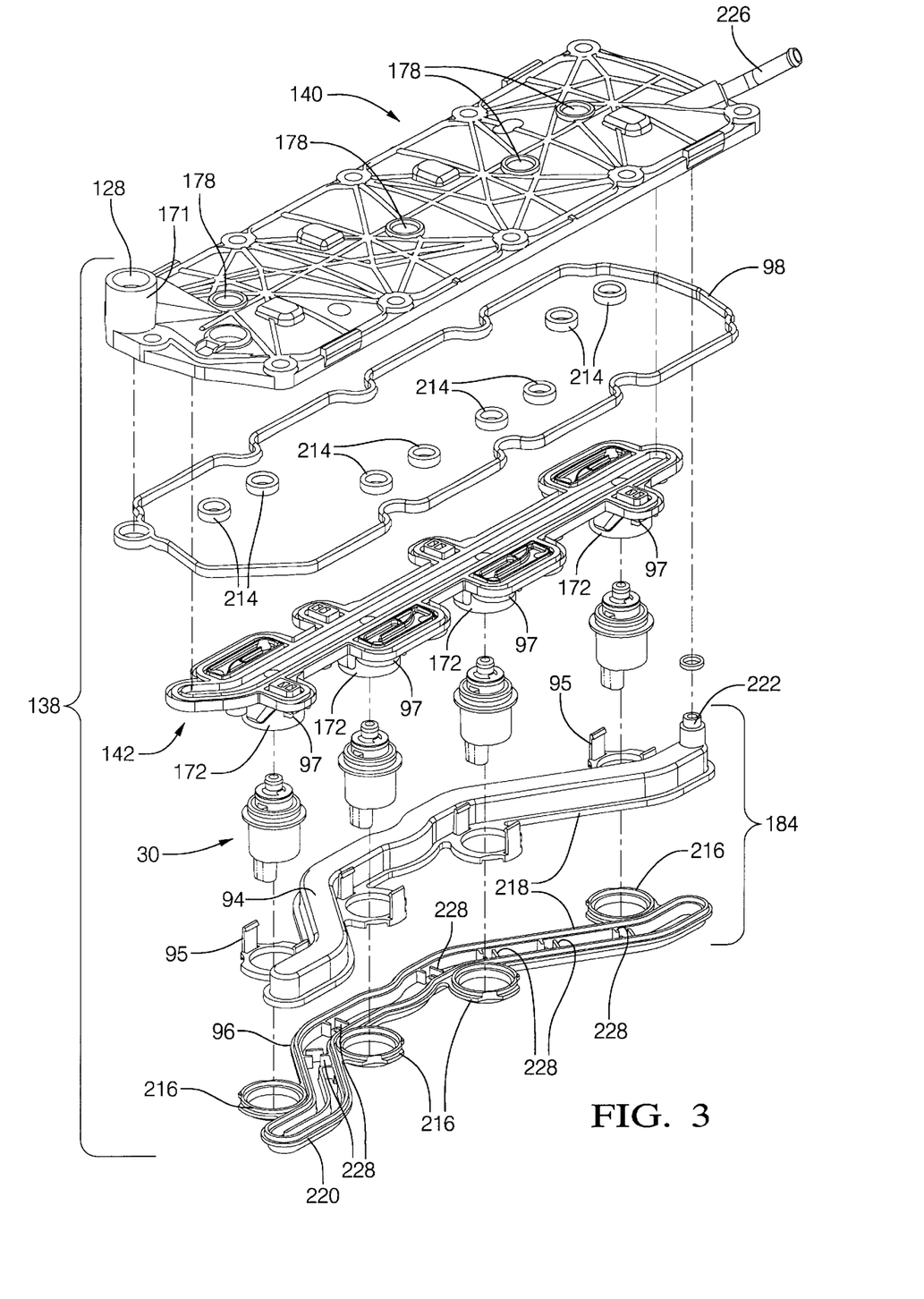
FIG. 3 is an exploded isometric view from above of a hydraulic manifold assembly or LOMA with connected solenoid retainer/PCV retainer in accordance with the invention.
Figure 4:
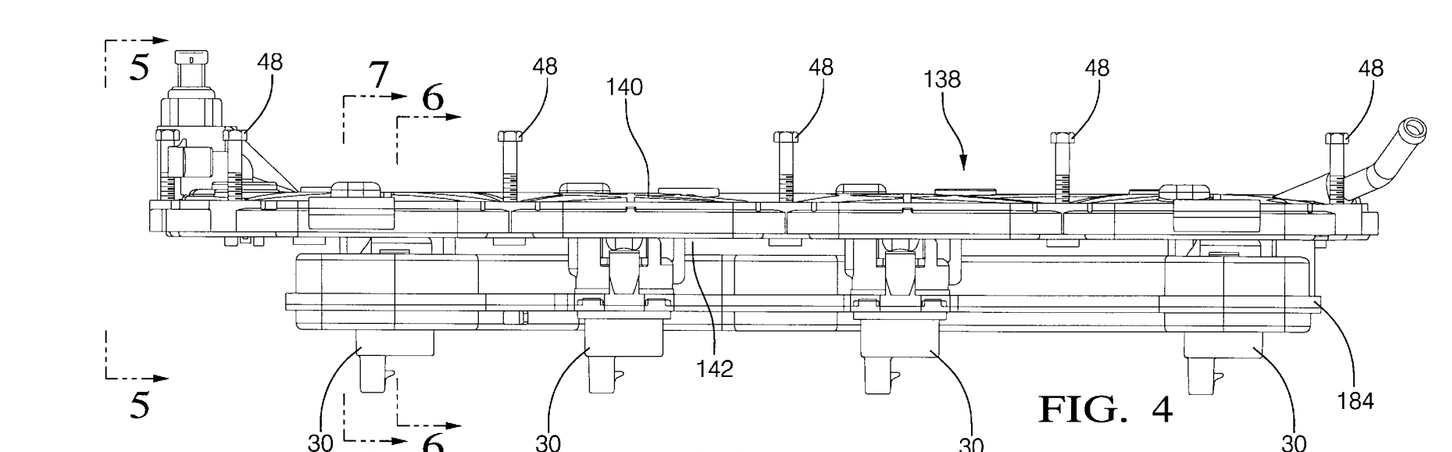
FIG. 4 is a side elevational view of the LOMA shown in FIG. 3.

Referring to FIG. 2, a prior art hydraulic manifold assembly 38, including solenoid valve retainer 84 are shown. Manifold assembly 38 includes a top plate 40, a bottom plate 42, and a gasket plate 44 sandwiched between the top and bottom plates. Typically, at least the top and bottom plates are formed by investment casting of aluminum. The three plates are held together by bolts 46 to form a complex oil distribution manifold 38 as described below. When assembled, manifold assembly 38 may be conveniently installed into an internal combustion engine, for example, via bolts 48 extending through bores in top plate 40 and gasket plate 44 and being secured, for example, onto engine block towers provided along opposite sides of the valley of a V-style engine (not shown) for operative control of the deactivation lifters of the engine.

A first pattern of passages (not visible) is formed in the underside 51 of top plate 40, which may be expressed as a corresponding pattern of ridges 52 on the upper surface thereof. Similarly, a second pattern of passages 54 is formed in the upper surface 55 of bottom plate 42. Gasket plate 44 is provided with a plurality of bores extending completely through the plate at selected locations for connecting passages in top plate 40 with passages in bottom plate 42. The upper surface 58 and the lower surface 60 of gasket plate 44 are further provided with respective patterns of resilient gasketing material generally in the shape of the patterns of passages and bores in the top and bottom plates. Typically, the gasketing patterns are disposed in shallow grooves in surfaces 58,60 into which the gasketing material may be fully compressed when manifold assembly 38 is assembled.

The oil passages and gasketing patterns in plates 40,42,44 cooperate to define and form the oil galleries of a complex three dimensional hydraulic manifold assembly 38 for selectively distributing pressurized oil from an oil riser 70 to each of four solenoid control valves 30 received in sockets 72 formed in bottom plate 42. Control valves 30 extend through bottom plate 42 and the valve heads thereof seal against seats (not shown) on the underside of gasket plate 44. Each of the control valves 30 controls the activation and deactivation of all valve lifters for a given cylinder of a multi-cylinder engine via outlet ports (not visible) in manifold assembly 38; thus, four control valves are required, for example, to deactivate valves for four cylinders of an eight-cylinder engine.

Oil is distributed along the manifold assembly from riser 70 via a global supply gallery 76 which connects via bores 78 in gasket plate 44 to control valves 30. Riser 70 may be provided with an inline strainer housing 71 for ready replacement of strainer 28. When a valve 30 is energized to open, oil is admitted past solenoid valve 30 and upwards through plate 44 via bore 75 into an individual supply gallery 80 for supplying two deactivation valve lifters via bores 79.

Retainer 84 holds the solenoid control valves 30 in their respective sockets 72. Retainer 84 is typically cast of a high-temperature dielectric plastic and is provided with integral standoffs 92 through which it is bolted into top plate 40.

Referring to FIGS. 3 through 7, an improved hydraulic manifold assembly or LOMA 138 is shown. (Note: features identical with those in prior art manifold assembly 38 carry the same numbers; features analogous but not identical carry the same numbers but in the 100 series; and new features are shown in the 200 series.) LOMA 138 includes a top plate 140, bottom plate 142, solenoid valves 30, and retainer/PCV baffle 184. A perimeter gasket 98 is preferably used to seal top plate 140 against an engine (not shown) when LOMA 138 is attached by bolts 48 onto the valley of a V-style engine.

According to the present invention, retainer 184, which also is a PCV baffle as described in more detail below, is formed in an upper element 94 and a lower element 96 which are then joined along their mating edges as described below to form retainer/PCV baffle 184. Preferably, retainer/PCV baffle 184 is formed having flexible barbed tabs 95 protruding upwards from upper element 94 for engaging with mating catches 97 to secure retainer/PCV baffle 184 to bottom plate 142, thereby retaining solenoid valves 30 in proper position in sockets 172. In an alternative embodiment, retainer/PCV baffle 184 can be secured to bottom plate 42 or top plate 40 of prior art control manifold assembly 38 or to plates 140 or 142 of improved LOMA 138 with threaded fasteners.

Figures 10, 11:
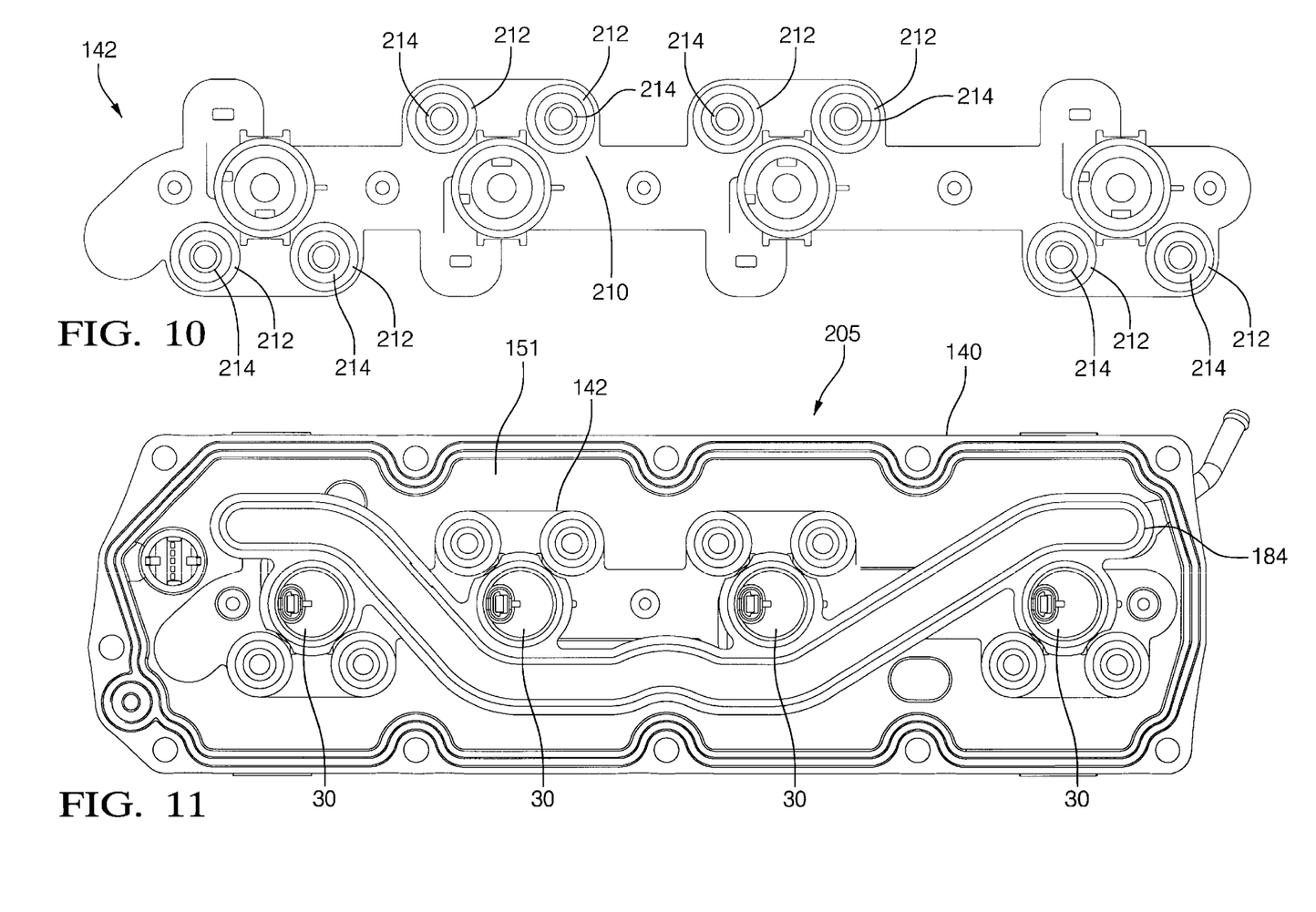
FIG. 10 is a bottom view of the lower plate in the assembly shown in FIG. 3.
FIG. 11 is a bottom view of the assembly shown in FIG. 4.
Figure 12:
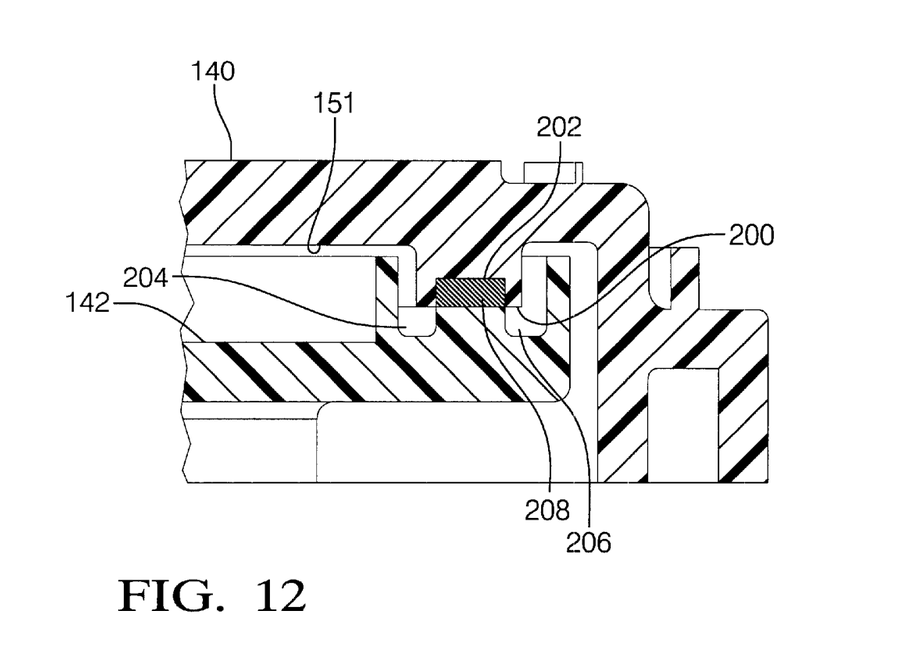
FIG. 12 is a detailed cross-sectional view taken through a portion of the assembly shown in FIG. 4, showing fusing of the upper and lower plates along mutual mating surfaces.

Referring to FIGS. 8, 9, 11, and 12, in a currently preferred method for attaching top plate 140 to bottom plate 142, top plate 140 is provided on its underside 151 with a continuous planar first mating surface 200 formed in a first pattern delineating the upper portions of various oil flow galleries in LOMA 138. Bottom plate 142 is provided on its upper side 155 with a planar second mating surface 202 formed in a second pattern which is generally the mirror image of the first pattern. Surface 202 is bounded on either side by first and second grooves 204,206 (FIG. 12). Top plate 140 and bottom plate 142 preferably are formed of a thermoplastic polymer having a relatively high melting temperature, for example, a glass-filled poly phthalamide (PPA). The top and bottom plates are joined along mating surfaces 200,202 preferably by fusion, and preferably by vibration welding wherein the plates are urged together, preferably at a loading of about 200–400 pounds per square inch, preferably about 300 pounds per square inch of mating surface, and are vibrated past each other, preferably at a frequency of about 120–240 Hz. Under these conditions, surfaces 200,202 liquefy, compress, and fuse in a fusion zone 208, forming a mechanical and hermetic seal defining the oil galleries in a subassembly 205 (FIG. 11, shown with retainer/PCV baffle 184 also attached). Polymer squeezed out of zone 208 is collected in grooves 204,206 which function as "flash traps." Preferably, zone 208 is compressed to a predetermined extent, preferably about 0.030–0.070 inch.

Referring to FIG. 10, the underside 210 of bottom plate 142 is formed having ports 212 for receiving resilient circular oil seals 214 (also FIG. 3) for sealing to the actuating oil passages (not shown) controlled by the manifold.

Referring again to FIG. 3, as described above, in addition to securing solenoid valves 30 into bottom plate 142, retainer 184 may also be configured as a PCV baffle. Upper and lower elements 94,96 are preferably formed of a high-temperature thermoplastic by injection molding, similarly to top and bottom plates 140,142, and are similarly fused along planar mating surfaces by vibration welding to yield retainer/PCV baffle 184. Preferably, upper and lower elements 94, 92 are formed of a thermoplastic polymer having a relatively high melting temperature, for example, a glass filled PPA. Upper and lower elements 94, 96 are joined along their mating surfaces, preferably by vibration welding wherein the plates are urged together at a loading of about 200–400 pounds per inch of mating surface and are vibrated past each other, preferably at a frequency of about 120–240 Hz. "Flash trap" grooves, similar to those shown as numerals 204, 206 in plate 142 (FIG. 12) can be formed in one of either mating surfaces of elements 92, 94 to facilitate the formation of a mechanical, hermetic seal between elements 92, 94.

Figure 5:
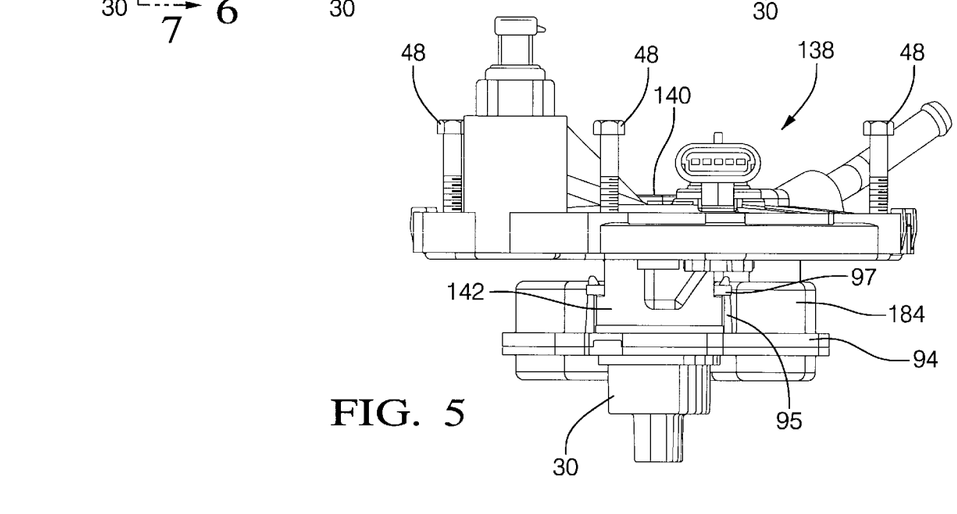
FIG. 5 is an end elevational view of the LOMA shown in FIG. 3.
Figure 6:
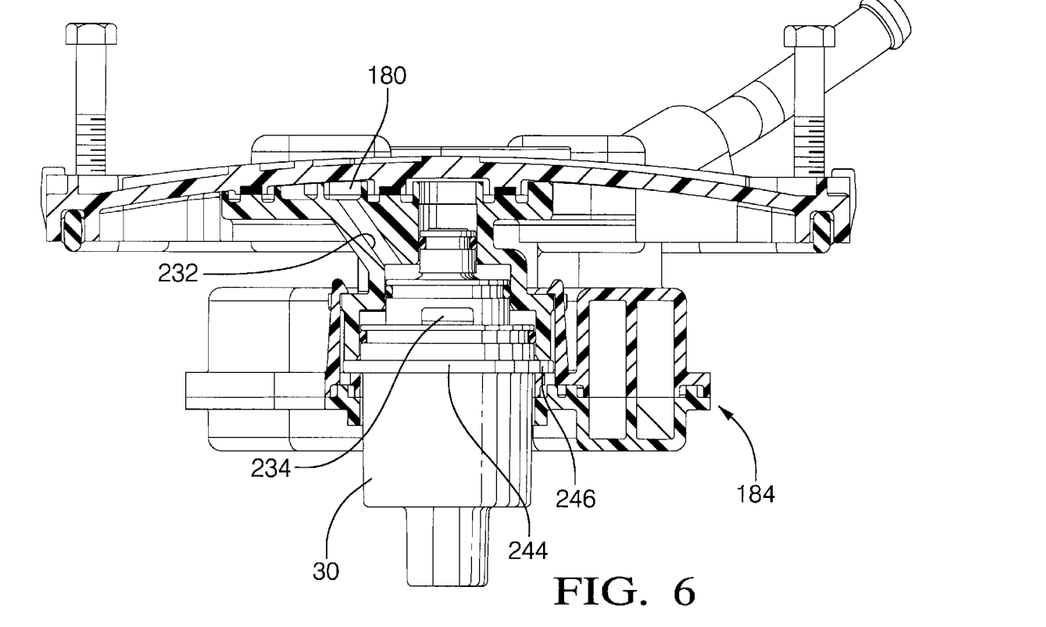
FIG. 6 is a cross-sectional view taken along line 6—6 in FIG. 11.
Figure 7:
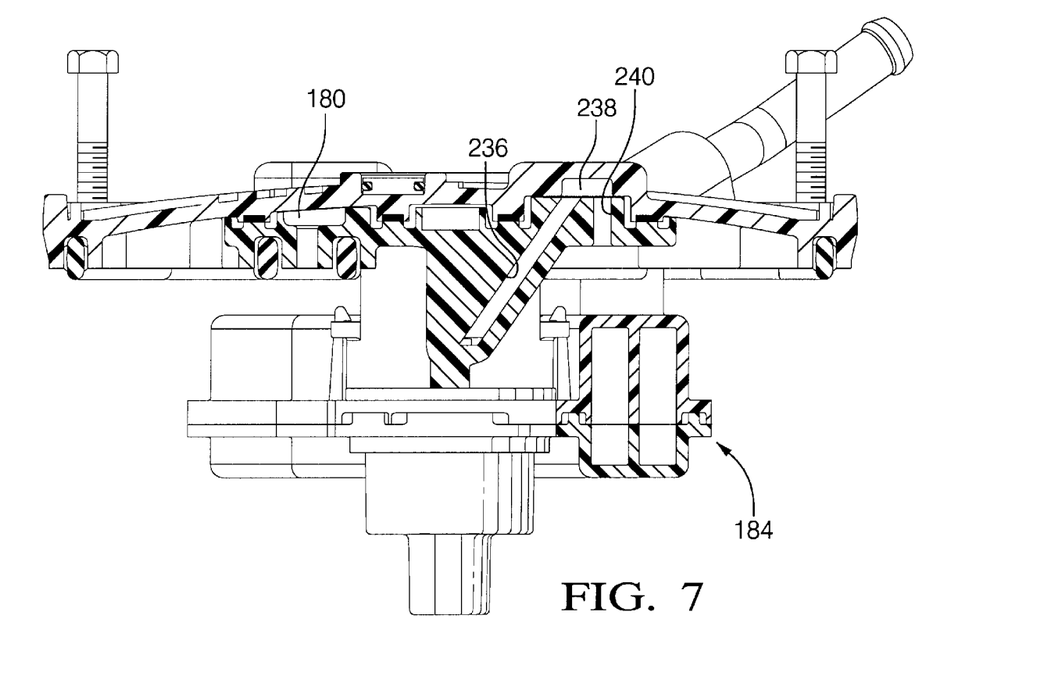
FIG. 7 is a cross-sectional view taken along line 7—7 in FIG. 11.
Figure 8:
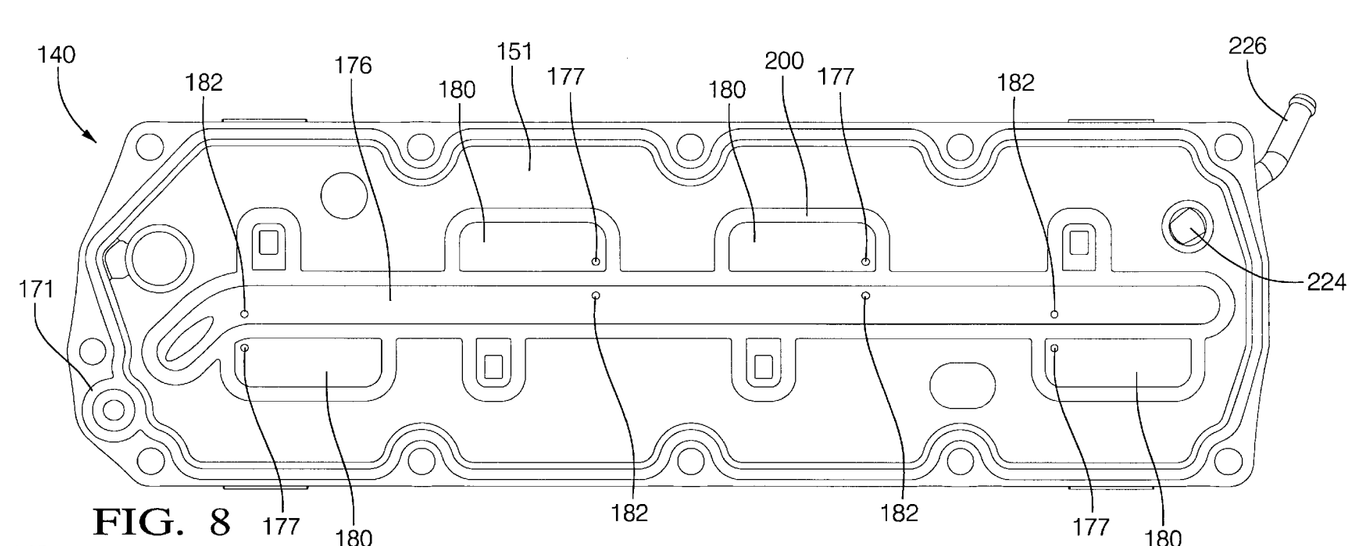
FIG. 8 is a bottom view of the upper plate in the assembly shown in FIG. 3.
Figure 9:
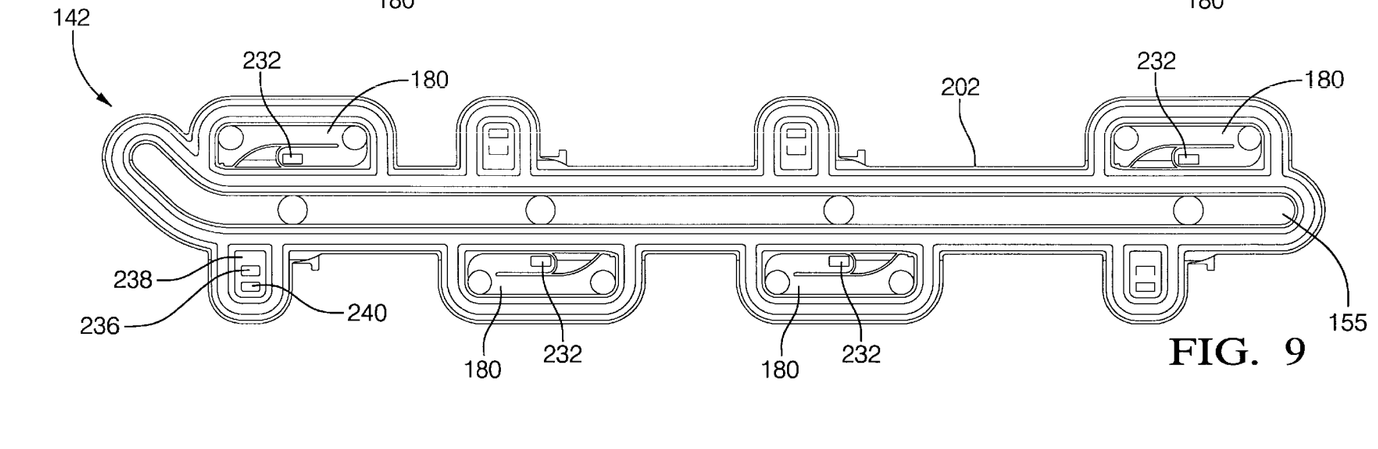
FIG. 9 is a top view of the lower plate in the assembly shown in FIG. 3.

The resulting retainer/PCV baffle includes a supportive bucket 216 for retaining each solenoid valve. The buckets are attached to a generally hollow sinusoidal member 218 having an entry aperture 220 and an exit fitting 222 matable with a port 224 and fitting 226 (FIGS. 3 and 8) for connection to the intake manifold (not shown) of the engine. Preferably, the interior of member 218 is provided with a series of offset baffles 228 forming a labyrinthine pathway through member 218 for separation of oil droplets from air as crankcase and valve blowby is drawn through member 218 by intake manifold vacuum. Separated oil droplets agglomerate within member 218 and run back into the engine via entry aperture 220. As described above, retainer/PCV baffle 184 is preferably provided with tabs 95 protruding upwards from upper element 94 for engaging with mating catches 97 to secure retainer/PCV baffle 184 to bottom plate 142, thereby retaining solenoid valves 30 in proper position in sockets 172, as shown in FIGS. 5 through 7.

Figure 13:
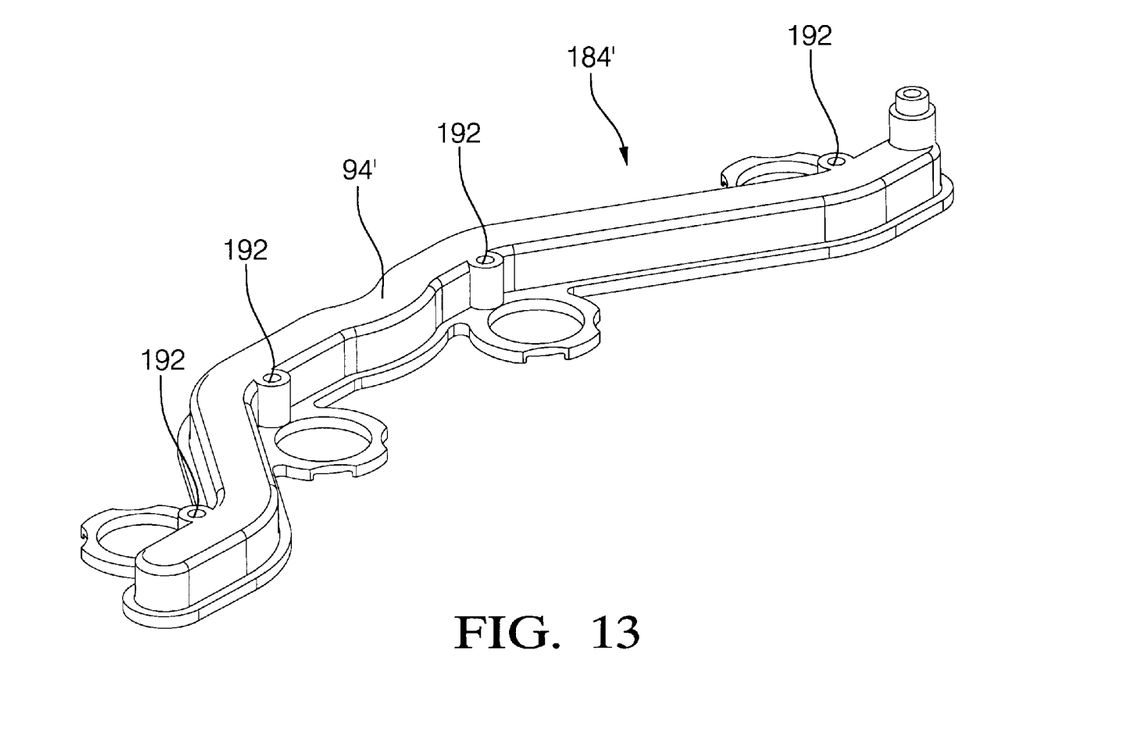
FIG. 13 is a cross-sectional view of the retainer/PCV baffle (upper element) of an alternate embodiment.

As briefly described above, upper element 94' of a second retainer/PCV baffle embodiment 184', as shown in FIG. 13, is formed without tabs 95 and instead is provided with a plurality of hollow fastener compression tubes 192. Retainer/PCV baffle 184' may then be secured to either plates 40 or 42 of prior art metal manifold assembly 38 or plates 140 or 142 of improved polymer LOMA 138 by bolts 46 (as in FIG. 2), or equivalent fasteners. The compression tubes may be formed in both the upper and lower elements, may be formed as molded polymer features in the element(s), or may be formed of metal and pressed or molded into the polymer element(s) as known in the art. Thus, PCV capability can easily be provided to prior art manifold assembly 38 by substitution of retainer/PCV baffle 184', for retainer 84.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A retainer for holding a plurality of solenoid valves in a hydraulic manifold assembly for activation and deactivation of engine valves in an internal combustion engine, wherein said retainer is a positive crankcase ventilation baffle connectable to an intake manifold of said engine.

2. A retainer for holding a plurality of solenoid valves in a hydraulic manifold assembly for activation and deactivation of engine valves in an internal combustion engine, comprising:
    a) a hollow longitudinal member;
    b) a plurality of buckets attached to said member, each of said buckets being supportive of a one of said plurality of solenoid valves in operating position in said manifold;
    c) an entry aperture into said hollow longitudinal member; and
    d) an exit fitting for connection to an intake manifold of said engine.

3. A retainer in accordance with claim 2, wherein said longitudinal member includes an upper element and a lower element, said elements being joined together as by fusion of respective mating surfaces thereupon to form said retainer.

4. A retainer in accordance with claim 3, wherein said fusion is caused by vibration welding.

5. A retainer in accordance with claim 2, further comprising an upper element and a lower element wherein at least one of said upper element and said lower element of said retainer is formed of a high-temperature polymer.

6. A retainer in accordance with claim 5, wherein said polymer is glass-filled poly phthalamide.

7. A retainer in accordance with claim 2, further comprising a plurality of offset baffles disposed within said hollow member defining a labyrintine path for engine vapors between said entry aperture and said exit fitting.

8. A retainer in accordance with claim 2, further comprising at least one compression tube disposed within said hollow member for attachment of said retainer into said hydraulic manifold assembly by threaded fasteners.

9. A retainer in accordance with claim 2, further comprising at least one tab extending from said retainer for attachment of said retainer into said hydraulic manifold assembly.

* * * * *